Dec. 7, 1943.   O. H. WATSON   2,336,142
APPARATUS FOR LOCATING THE PLANE OF GRAVITY OF AN OBJECT
Filed Jan. 30, 1941   3 Sheets-Sheet 1
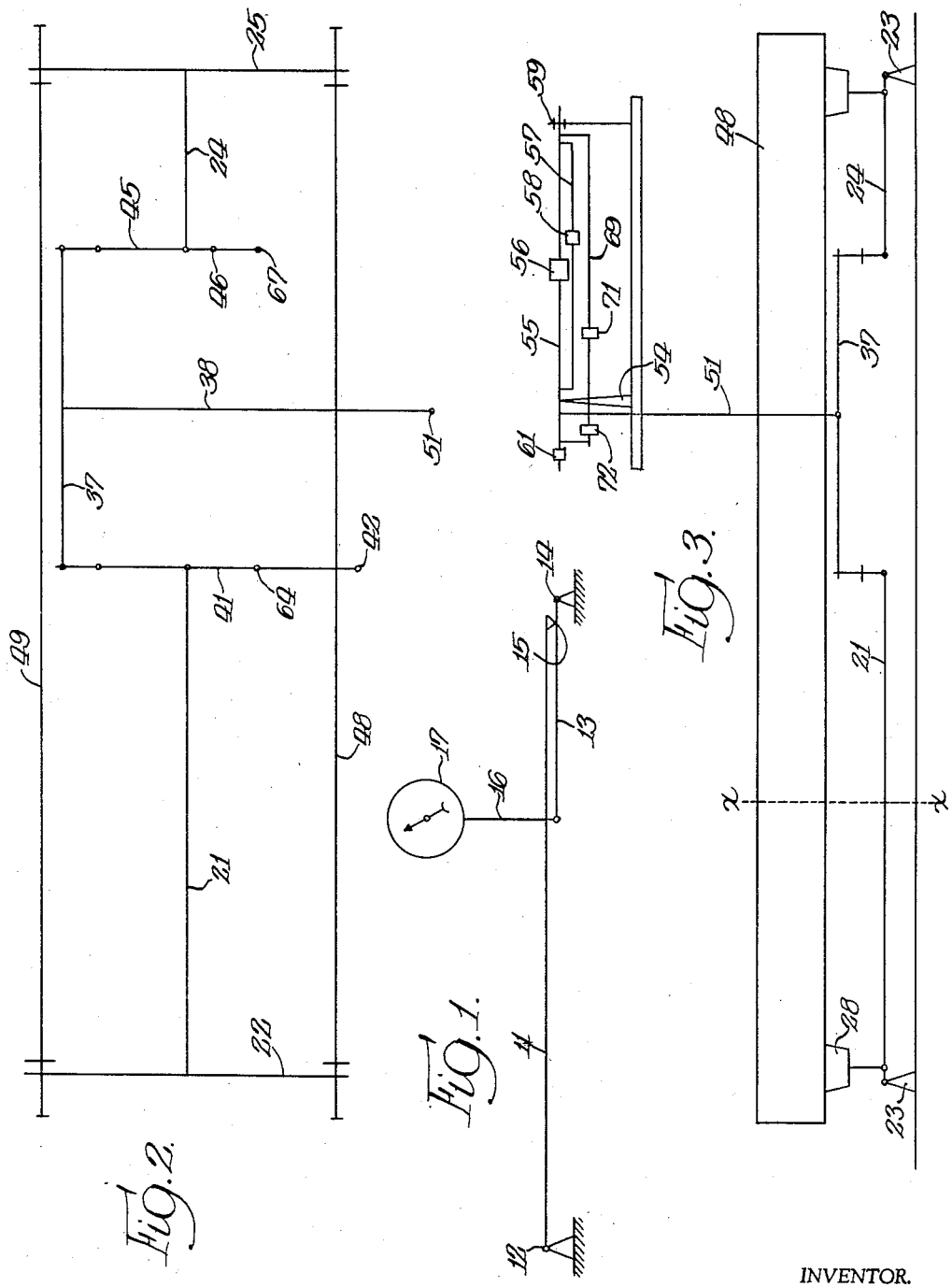
INVENTOR.
Oliver H. Watson
BY
Ira J. Wilson Atty.

Dec. 7, 1943.   O. H. WATSON   2,336,142
APPARATUS FOR LOCATING THE PLANE OF GRAVITY OF AN OBJECT
Filed Jan. 30, 1941   3 Sheets-Sheet 2
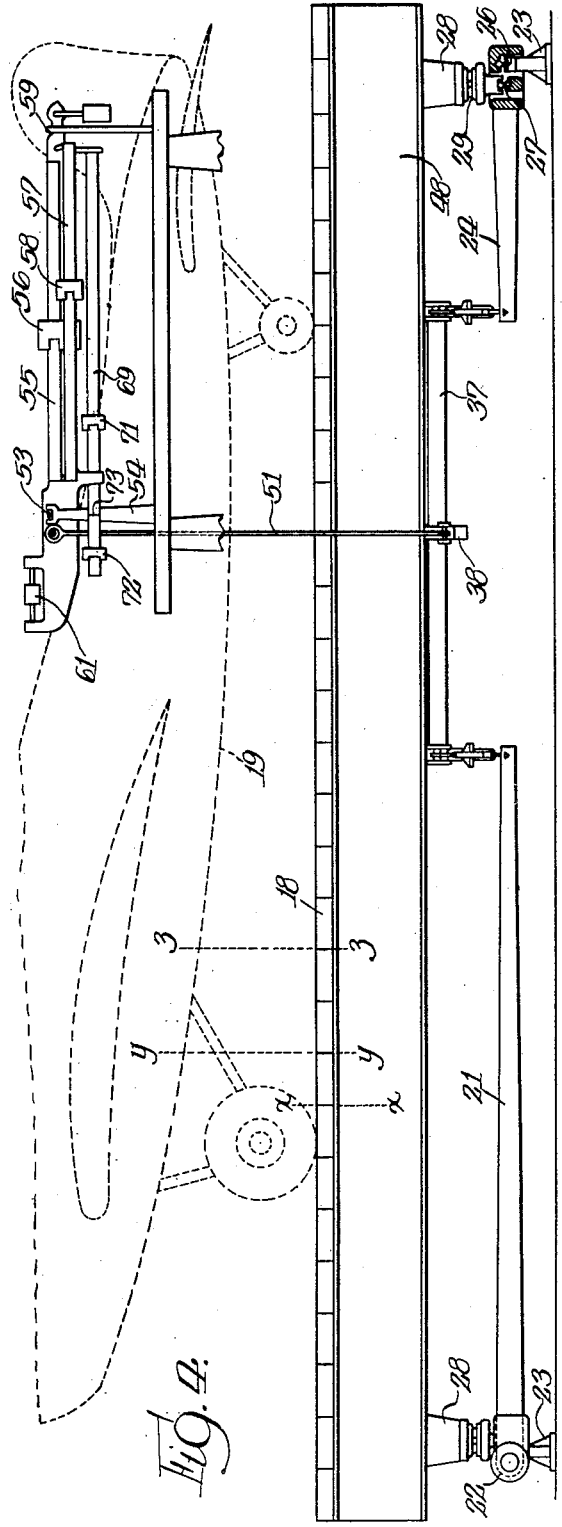
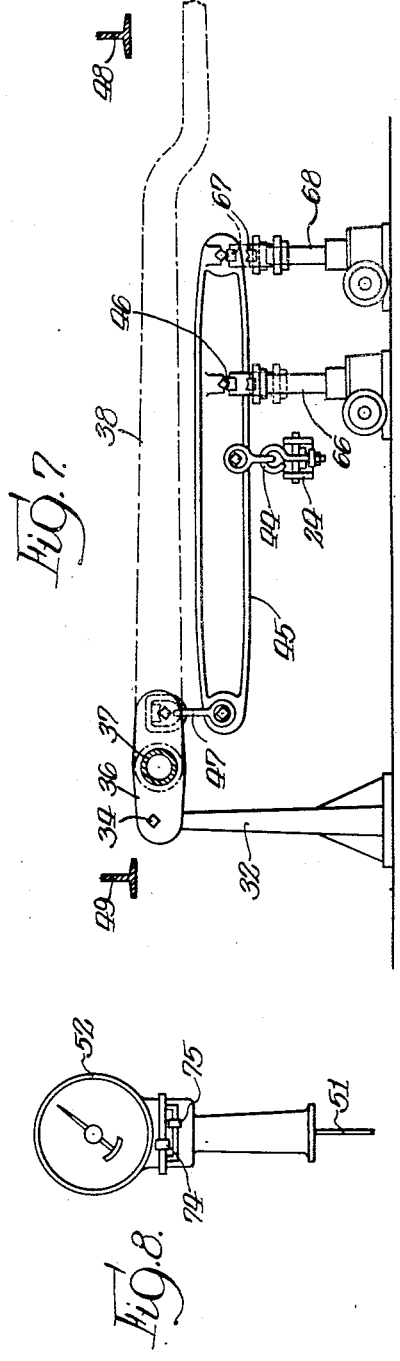
INVENTOR.
Oliver H. Watson,
BY
Ira J. Wilson Atty.

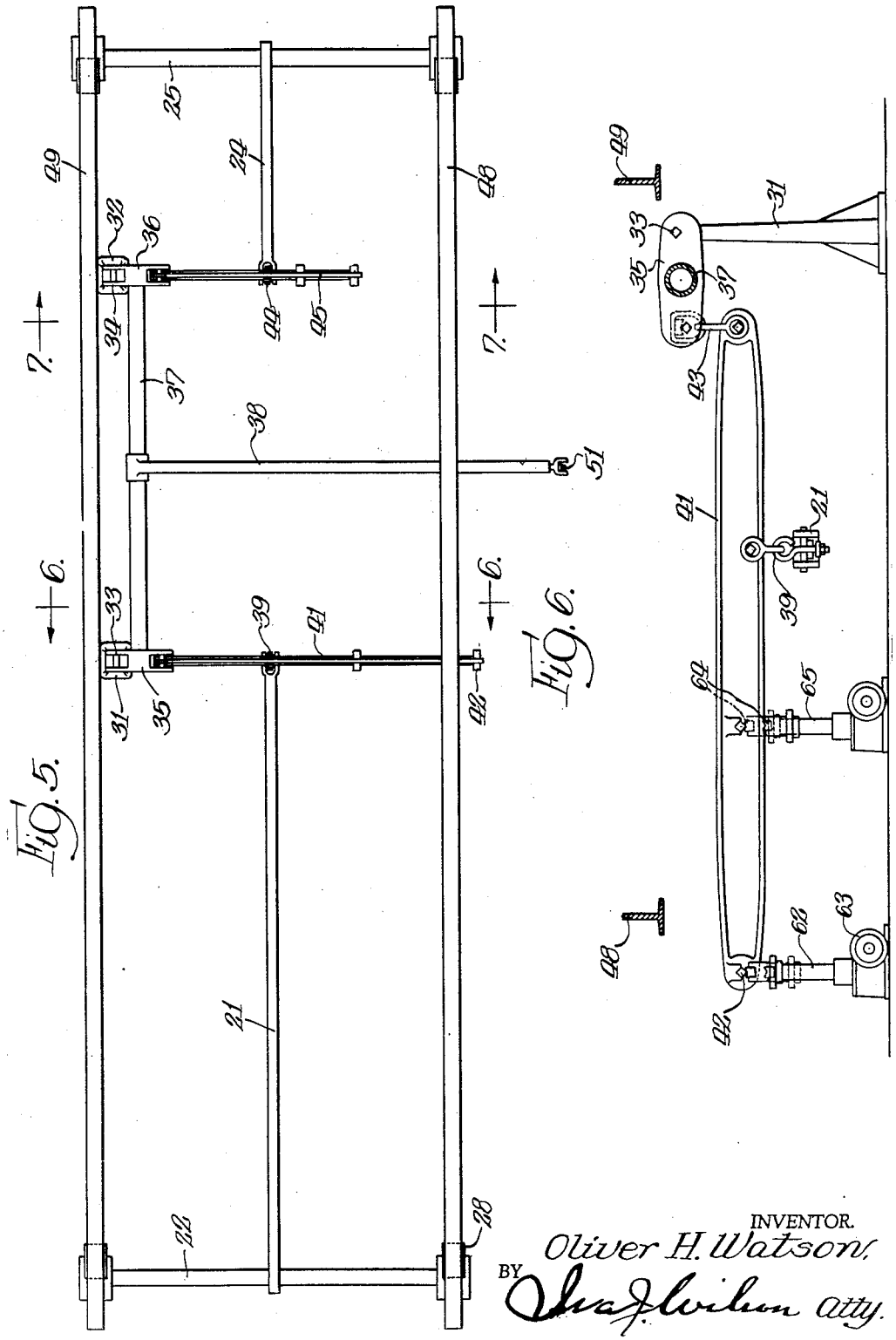

Patented Dec. 7, 1943

2,336,142

UNITED STATES PATENT OFFICE 2,336,142

APPARATUS FOR LOCATING THE PLANES OF GRAVITY OF OBJECTS

Oliver F. Watson, Delavan, Ill.

Application January 30, 1941, Serial No. 376,630

14 Claims. (Cl. 265—71)

This invention relates generally to apparatus of the character commonly employed for weighing purposes, that is, for ascertaining the actual weight of objects, but in accordance with my invention the principles and functions of such an apparatus are so modified that not only the actual weight of an object may be ascertained thereby, but, in addition, the plane of gravity of said object may be determined.

In speaking of the plane of gravity of an object, I refer to a vertical plane in which the center of gravity of the object under observation lies. Should it be desirable in a given instance to ascertain the actual center of gravity of an object, that may be done by pursuing the hereinafter described method further. For instance, when the plane of gravity of the object in one position has been determined by my apparatus in the manner hereinafter explained, the object may be shifted about a vertical axis through an angle of ninety degrees and the plane of gravity determined in that position, whereupon the object may be shifted through an arc of ninety degrees about a horizontal axis and the plane of gravity again determined. The point of intersection of the three planes thus determined will be the center of gravity of said object. For the practical purposes, however, for which my invention is primarily intended, the determination of the plane of gravity of an object when in one position will suffice.

While my invention may be utilized for locating the plane of gravity or even the center of gravity of various objects and for various purposes, one illustration of its practical application should be sufficient for an understanding of the principles involved.

For instance, the successful manipulation and control of aeroplanes in flight is dependent to a considerable extent upon the proper location of the center of gravity of the plane. In the designing and construction of aeroplanes, the center of gravity which remains fixed without load is definitely located and the controls are designed accordingly. When the plane is heavily loaded, however, and particularly a large plane carrying heavy tonnage such as freight or bombs, the center of gravity may, as the result of the load placement, shift considerably either forwardly or rearwardly of the designed center, so as to render the plane either nose heavy or tail heavy. Under such conditions, it may fail to properly respond to the manipulation of the controls. Many unexplained accidents may be attributed to such longitudinal shifting of the center or plane of gravity due to improper distribution of the weight in loading the plane.

One of the primary purposes of my present invention is to provide an apparatus by which the longitudinal position of the plane of gravity of a loaded plane or other object may be quickly and accurately determined, so that, if the plane of gravity as the result of improper loading has been shifted to an extent endangering control of the plane, the cargo may be redistributed to remedy the error and obviate the resultant danger before the plane is permitted to take off.

Another object of my invention is to provide an apparatus of the character indicated which will be simple in construction and economical to produce and which will be efficient, durable and reliable in use.

In carrying out the principles of my invention it is essential, as a prerequisite to the actual location of the plane of gravity of the object, that the actual weight of the object be ascertained. This may be done, if desired, with an ordinary weighing scale of suitable design and capacity. If such an independent weighing scale is used, the location of the plane of gravity of the object of known weight may be determined by means of the most simple embodiment of my invention, which is structurally independent of and unconnected with such weighing scale.

For practical purposes, however, and for reasons of economy of space, time and labor, all of which are of paramount importance in the operation of an airport, my invention in its preferred form embodies the means for weighing the object and the means for subsequently locating its plane of gravity in a single apparatus. With such an apparatus, both weight of the object and the location of its plane of gravity are determined while the object remains in unchanged position on the platform of the apparatus.

Furthermore, in this embodiment of my invention one and the same lever system and indicating mechanism are employed in ascertaining the true weight and the plane of gravity of the object, thereby minimizing the construction as well as the maintenance and operation costs.

On the accompanying drawings I have illustrated those embodiments of my invention which at present seem preferable, although it should be understood that the illustrations selected are merely exemplifications of the principles involved.

Referring to the drawings,

Fig. 1 is a diagrammatic view illustrating a simple form of apparatus for locating a plane of gravity;

Fig. 2 is a diagrammatic plan view illustrating the principles of an apparatus for weighing an object and locating its plane of gravity;

Fig. 3 is a diagrammatic side elevation of the apparatus illustrated in Fig. 2;

Fig. 4 is a side elevation of the apparatus diagrammatically illustrated in Figs. 2 and 3 and showing in dotted lines an object to be tested located on the platform of the apparatus;

Fig. 5 is a plan view of the lever system beneath the platform of the apparatus shown in Fig. 4;

Fig. 6 is a sectional view on the line 6—6 of Fig. 5;

Fig. 7 is a sectional view on the line 7—7 of Fig. 5; and

Fig. 8 is an elevation of an automatic dial indicating mechanism capable of embodiment in my invention.

In the simple form of apparatus diagrammatically illustrated in Fig. 1, reference character 11 indicates a platform of suitable size to receive and support the object to be tested. The word "platform" used in this specification and in the claims hereof is employed in a generic sense to denote not merely a flat surface, such as the ordinary scale platform, but any size or shape of support, such as a hopper, a frame or any other structure, irrespective of shape, capable of supporting an object to be tested.

The platform of Fig. 1 is supported at one end upon a knife edge 12 and at its opposite end upon an end extension lever 13 fulcrumed at 14 and supporting the overlying end of the platform 11 at 15. The inner end of lever 13 is connected through an upwardly extending link or beam rod 16 with an indicator 17 of any preferred type, such as a spring dial or a scale beam of suitable character equipped with one or more movable poises.

Any object supported directly over the knife edge 12 will impart no weight impulse to the indicator. If supported, however, on the platform directly over the point 15, its full weight will be applied to the lever 13 and transmitted in a reduced degree to the indicator. If the object be positioned on the platform midway between the points 12 and 15, the indicator will obviously receive and indicate but one-half the weight impulse that it received and indicated when the object was positioned over the point 15. Similarly, any position between the points 12 and 15 at which the plane of gravity of the object is located will be correspondingly shown on the indicator. The indicator, therefore, indicates the location of the object longitudinally of the platform, rather than the actual weight of the object.

The notches on a weigh beam or the indicia on a spring scale dial are spaced to correspond with a definite number of inch pounds. For instance, on any weighing scale the beam notches or the scale indicia indicate unit deviations in weight of an object from a predetermined weight for which the scale is designed and which is called the characteristic weight of that scale. Thus, the distance between successive notches or indicia may represent one pound, one hundred pounds, or any number of pounds, according to the design and the characteristic weight of the particular scale.

Applying this principle to the simple apparatus of Fig. 1, if we assume that one thousand pounds is the characteristic weight of the apparatus, then one thousand pounds located on the platform directly over the point 15 will appear as one thousand pounds on the indicator 17. If this weight now be positioned on the platform midway between the points 12 and 15, the indicator will show one-half the amount previously indicated. Knowing the actual weight of the object, the operator from a reading of the indicator can determine the exact location of the plane of gravity of the object on the platform. If the actual weight of the object is greater or less than the characteristic weight of the apparatus, suitable correction to the reading is made to compensate for this deviation.

It will be manifest, therefore, that by means of the simple apparatus disclosed in Fig. 1, the locus on the platform 11 of the plane of gravity of an object may be readily determined, provided the actual weight of the object has been ascertained before it is positioned on the platform.

Referring now to the more practical embodiment of the invention by means of which both the actual weight of an object and the locus of the plane of gravity thereof may be ascertained while the object remains in one fixed position on the platform, the structure and mode of operation of such an embodiment will be understood from Figs. 2 to 7, inclusive, of the drawings.

Referring to Fig. 4 of the drawings, the platform 18 is illustrated as being of the ordinary flat type upon which the object to be tested, such for instance as the aeroplane 19 shown in dotted outline, may be run or wheeled into position. The platform is supported upon a lever system similar in general structure to, but differing in details later pointed out from, the lever system of an ordinary platform weighing scale, different types of lever systems, such as the straight lever type and the torsion lever type, are in common use. While the principles of my invention may be incorporated in the structures of the various types of lever systems, the torsion lever type has been selected for the purpose of exemplifying the principles of my invention.

This lever system, as will be apparent from Figs. 4 and 5, comprises an end extension lever 21 extending longitudinally beneath the platform and fixed at its outer end upon a torsion tube 22 extending transversely of the platform and equipped at each end with a knife edge pivot upon which the platform is supported. Through the intermediary of other pivots located in fixed relation to said first pivots, the torsion tube is fulcrumed upon fixed pedestals 23.

A second end extension lever 24 extends longitudinally beneath the opposite end of the platform and is fixed at its outer end upon a torsion tube 25, which is likewise fulcrumed at its ends upon pedestals 23 and serves to support the overlying end of the platform. Since the four supporting pedestals 23 and platform supports are all alike in structure, one only is illustrated in detail on the drawings. Viewing the right hand portion of Fig. 4, it will be observed that the pedestal 23 provides a bearing 26 upon which one end enlargement of the torsion tube 25 is fulcrumed. This enlargement carries two pivots set in exact relationship. The fulcrum pivot rests upon bearing 26 supported by pedestal 23. The weight of the overlying end of the platform 18 is supported through the intermediary of an inverted pedestal 28 carrying a load bearing 27 which rests upon the other load pivot. Incorporated in the structure of pedestal 28 for the insurance of accuracy and sensitivity is a plurality of steel balls 29. Platform supports of this general character are common, and the one shown is to be considered as illustrative merely. It will thus be seen that the weight impulse of one end of the platform 18 is transmitted to the end extension lever 21, and the weight impulse of the opposite end of the platform is similarly transmitted to the end extension lever 24.

From Figs. 4 to 7, inclusive, it will be apparent that beneath one side of the platform there is located a pair of stationary pedestals 31 and 32, respectively, upon which is fulcrumed at 33 and 34 the end members 35 and 36, respectively, of a lever assembly comprising a torsion tube 37 rigidly associated with the end members and a side extension lever 38 fixed on the tube intermediate its ends and extending transversely beneath the platform. This lever assembly is connected to the end extension levers 21 and 24 in the manner best shown in Figs. 6 and 7.

Referring to Fig. 6, it will be observed that the inner end of end extension lever 21 is connected through linkage 39 with a change lever 41 fulcrumed for present purposes of consideration at 42 and connected at its opposite end through linkage 43 with end member 35.

Similarly, viewing Fig. 7, it will be observed that the inner end of end extension lever 24 is connected by linkage 44 with a change lever 45 fulcrumed for present purposes of consideration at 46 and connected at its opposite end through linkage 47 with the end member 36. The relative location of these various levers with respect to the platform will be obvious from the location of the side frame members 48 and 49 upon which the platform top is supported.

The free end of the side extension lever 38 is connected by a link or beam rod 51 with an indicator which may be of the dial type designated 52 in Fig. 8, or the balance beam type illustrated in Fig. 4 wherein the beam is fulcrumed at 53 upon a beam stand 54 and includes a bar 55 upon which the main weighing poise 56 is adjustable and the bar 57 upon which the fractional weighing poise 58 is adjustable in the usual manner. One end of the weighbeam travels in the loop stand 59, while the other end is equipped with the usual balance ball or weight 61 by means of which the scale is brought to balance for weighing purposes in the ordinary manner.

The lever system, weighbeam, and associated parts thus far described are of the general character commonly in use, except that the end extension levers 21 and 24 instead of being of equal length and equal ratio, as is customary, are of unequal length and unequal ratio, and, in addition, the change levers 41 and 45 interposed between the end extension levers and the side extension lever instead of being of equal length and mounted on fixed fulcrums, as is customary, are of unequal length and are mounted on changeable fulcrums. The purpose of these deviations from standard construction will now be explained.

When a lever system interposed between the ends of a scale platform and a weighbeam comprises levers of equal ratio throughout from both ends of the platform, the weight impulse of an object on the platform will be transmitted to the weighbeam in the same degree irrespective of the location of such object on the platform. In other words, if the scale is properly balanced, the true weight of the object will be indicated by the indicator, whether it be of the dial type or the beam type, regardless of the position of the object on the platform. When, however, only one end of the platform is equipped with a lever system leading to an indicator, as has previously been explained in connection with Fig. 1, or when the ends of the platform are supported by levers of unequal ratio, the weight impulse reading of the indicator will vary from the true weight reading in accordance with the position of the object on the platform. This principle is utilized in my present invention in adapting the apparatus to the dual function of true weight weighing and the subsequent determination of the locus of the plane of gravity of the object weighed.

Let us consider first the adaptation of my apparatus embodying end extension levers of unequal ratios for determining or ascertaining the true weight of an object located on the platform and irrespective of its location thereon. In order to compensate for the unequal ratios of end extension levers 21 and 24, change levers 41 and 45 to which these end extension levers are respectively connected are so proportioned when lever 41 is fulcrumed at 42 and lever 45 is fulcrumed at 46 that the aggregate weight impulses transmitted thereby to the indicator mechanism will be the same irrespective of whether the major portion of such aggregate impulse is received from one end or the other of the platform. By thus proportioning change levers 41 and 45 to compensate for the unequal ratios of end extension levers 21 and 24, a true weight reading may be obtained from the indicating mechanism irrespective of the position on the platform of the object being weighed. Therefore, disregarding at present the additional poises, the purpose of which will later appear, the scale may be balanced in the usual manner by the balance ball 61, and the weight of an object on the platform may be ascertained from a dial reading or by manipulation of the poises 56 and 58 in the customary manner.

For the purpose, however, of determining the locus on the platform of the plane of gravity of an object, my invention contemplates the establishment of a different condition which is based upon the unequal ratios of end extension levers 21 and 24. The establishment of this condition involves the changing of the fulcra of change levers 41 and 45 and the addition to the indicating mechanism, whether it be of the weighbeam or dial type, of certain adjustable poises.

Referring now to change lever 41, it will be manifest from Fig. 6 that fulcrum point 42 upon which the lever is fulcrumed for actual weight weighing is carried by an adjustable support or pedestal 62 in the form of a mechanical or hydraulic jack preferably operable by a hand wheel 63 or by power, if preferred. A second fulcrum point 64 carried by a similar adjustable pedestal 65 is located nearer the connection 39 between this lever and the end extension lever 21. When the apparatus is to be used to determine the plane of gravity of an object on the platform, pedestal 62 is lowered, and pedestal 65 elevated until lever 41 is fulcrumed at point 64 instead of at point 42.

Likewise, the fulcrum of lever 45 is changed by the lowering of fulcrum point 46 carried by adjustable pedestal 66 and raising fulcrum point 67 carried by adjustable pedestal 68. The leverage of lever 41 is consequently increased, and the leverage of lever 45 is reduced. This change of leverage will obviously throw the scale out of balance on the indicator. The effect of this is then compensated for by the additional poises on the indicator above mentioned and in the following manner:

From Figs. 3 and 4, it will be observed that the weighbeam comprises in addition to the main weighing bar 55 and the fractional weighing bar 57 an additional bar 69 extending both forwardly and rearwardly of the vertical plane of the beam fulcrum 53 and equipped with two adjustable poises 71 and 72.

In the preceding description of the method of balancing the apparatus for true weight weighing, the fact that the apparatus will not balance so as to indicate true weight unless the plane of gravity of the platform is located longitudinally in a position determined by the relation of the levers of unequal ratio was disregarded in the interest of simplicity of description. It is a fact, however, that the unequal lever ratios employed determine the location of what is termed a critical plane in which the center of gravity of the platform must be located to obtain true balancing without the employment of a compensatory adjunct. The unequal lever ratios herein disclosed fix this critical plane, which is indicated on Fig. 4 by dotted line $x-x$, about midway between the center of the platform and the left hand end. To obtain a balance by compensating for the unequal lever ratios, the poise 71 is for balancing and for true weight weighing purposes placed in the position shown in Fig. 4, which is the zero position for this poise. For true weight balancing and weighing, the poise 72 is positioned at its zero position at the point indicated by reference character 73 which is shown as being located near the vertical plane of the beam fulcrum 53. With these poises thus positioned and the main and fractional poises 56 and 58 positioned at zero, the scale may be accurately balanced for true weight weighing purposes just as if the end extension levers 21 and 24 were of equal ratio and the poise 71 were omitted.

When, however, the fulcra of the change levers 41 and 45 are shifted from the points 42 and 46 to the points 64 and 67, respectively, the apparatus becomes unbalanced and the balance is then restored by adjustment of the poise 72 to substantially the position in which it is shown in Fig. 4. When the apparatus is thus adjusted, it is adapted for determining the locus of the plane of gravity of the object supported on the platform. If an automatic reading dial scale be employed instead of the weighbeam type above described, such automatic mechanism may be equipped with poises 74 and 75 (Fig. 8) corresponding in arrangement and function with the poises 71 and 72 of the beam scale type.

In the use of my apparatus for the dual purposes of true weight weighing and of determining the locus of the plane of gravity of the object weighed, the procedure is as follows:

First, the apparatus will be balanced for true weight weighing. To do this the supporting pedestals of the levers 41 and 48 are adjusted so that lever 41 is fulcrumed at point 42, and lever 45 is fulcrumed at point 46. The weight poises 56 and 58 are positioned at zero at the left end of their respective bars viewing Fig. 4, poise 72 is positioned at its zero point 73, and poise 71 is positioned at its zero point shown in Fig. 4. The apparatus may then be balanced for true weight weighing by manipulation of and adjustment of the position of the balance ball 61.

The apparatus is then balanced for determination of gravity plane purposes by shifting the fulcrum of lever 41 from point 42 to point 64, shifting the fulcrum of lever 45 from point 46 to point 67 and then, without disturbing poises 56, 58 or 71, adjusting poise 72 to the left from its zero position 73 until a balance is obtained. The position of poise 72 when the apparatus does balance must be noted in order that this poise may be restored to that same position when the apparatus is later employed for gravity plane determination purposes.

The object to be tested, for instance the aeroplane illustrated in Fig. 4, is then placed on the platform. Its true weight is determined by fulcruming lever 41 at point 42, fulcruming lever 45 at point 46, positioning poises 72 and 71 at their zero points, and then manipulating main and fractional weight poises 56 and 58 until a balance is obtained. The true weight of the object is ascertained by reading the positions of the main and fractional poises 56 and 58.

Without disturbing the positions of the weight poises 56 and 58, the fulcrum of lever 41 is shifted from point 42 to point 64, the fulcrum of lever 45 from point 64 to point 67, and the poise 72 is restored to its previously noted position, whereupon poise 71 is adjusted in one direction or the other from its zero position until a balance is established. The deviation of the poise 71 from its normal zero position, required to establish the balance, indicates the distance on one side or the other of the critical plane $x-x$ at which the plane of gravity of the object is located, provided the object is of that critical weight for which the spacing of the notches or marking on the bar 69 was designed and provided bar 69 is graduated to indicate distance. In the event the actual weight of the object, which has previously been determined by the weighing operation above described, is not the same as the critical weight for which the scale was designed, then correction of the reading of the position of poise 71 must be made by multiplying its reading by the characteristic weight and dividing the result by the true weight of the object.

In the design and construction of aeroplanes, the center of gravity of each plane is definitely fixed and the location of a vertical plane transverse to the longitudinal axis of the plane and including this point is marked on each plane. For illustrative purposes, such plane is indicated on Fig. 4 by the dotted line $y-y$. Let us assume that the plane has been loaded, placed on the platform, its actual weight determined, and the plane of gravity of the loaded plane is shown by the position of poise 71 to be locating in the position indicated by line $z-z$ of Fig. 4. This position of the plane of gravity, we may say, is shown to be three feet to the right or toward the plane's tail of the critical plane $x-x$ and also two feet rearwardly of the proper plane of gravity marked on the plane and indicated on the drawings by the line $y-y$. The plane is therefore tail-heavy and will not respond properly to its controls. The defect, having been ascertained by means of my invention, may be easily remedied by redistributing the load of the plane until the actual plane of gravity of the loaded plane coincides with the theoretical plane of gravity incorporated in the design of the particular aeroplane.

It is believed that the construction, manner of use, and many of the inherent and advantageous features of my invention will be understood and appreciated from the foregoing, and while I have shown and described a preferred embodiment, it should be obvious that the structural details are capable of considerable modification within the scope of my invention as defined in the following claims.

I claim:

1. In an apparatus for locating the plane of gravity of an object, the combination of a platform adapted to support the object, a lever system arranged to receive through the intermediary of the platform the weight of said object, said lever system including levers of unequal ratio respectively supporting the opposite ends of the platform, indicator mechanism, a connection between said mechanism and said lever system, and manually adjustable means attached to said indicator mechanism and cooperating with said lever system for determining the locus on the platform of the plane of gravity of the object resting thereon.

2. In an apparatus for locating the plane of gravity of an object, the combination of a platform adapted to support said object, a lever extending longitudinally of the platform and adapted to receive the weight of one end of the platform, a second lever extending longitudinally of the platform and adapted to receive the weight of the opposite end of the platform, said levers being of unequal ratio, a lever extending transversely of the platform, change levers of unequal ratio connected to be operated by said longitudinally extending levers and to operate said transversely extending lever, indicator mechanism connected with said transverse lever, and manually adjustable means including poises connected with said indicator mechanism whereby the locus of the plane of gravity of said object in relation to a predetermined point on the platform may be determined.

3. In an apparatus for locating the plane of gravity of an object, the combination of a platform adapted to support the object to be tested, a lever system supporting said platform, said system including a pair of end extension levers of unequal ratio influenced respectively by the opposite ends of said platform, a side extension lever extending transversely of the platform, means including change levers of a ratio to compensate for the unequal ratio of said end extension levers interposed between said side extension lever and said end extension levers, said change levers having changeable fulcra whereby their lever ratios may be made unequal, an indicator mechanism connected to be influenced by said side extension lever, and manually adjustable means connected to and operable in conjunction with said indicator mechanism whereby the locus of the plane of gravity of the platform supported object may be determined.

4. In an apparatus for locating the plane of gravity of an object, the combination of a platform adapted to support the object, an end extension lever supporting one end of the platform, a second end extension lever supporting the opposite end of the platform, said levers being of unequal ratio, transversely extending change levers connected respectively with said end extension levers, a side extension lever connected with said change levers, means for changing the positions of the fulcra of said change levers, and indicating mechanism operable by said side extension lever.

5. In an apparatus for locating the plane of gravity of an object, the combination of a platform for supporting said object, an end extension lever supporting one end of the platform, a second end extension lever supporting the opposite end of the platform, said levers being of unequal ratio, change levers connected respectively with said end extension levers, a side extension lever connected with said change levers, an indicator mechanism operable by said side extension lever, means for changing the location of the fulcra of said change levers to modify the leverage thereof, and adjustable poise means connected with said indicating mechanism to compensate for said leverage modification and whereby the locus of the plane of gravity of said object relatively to a critical plane determined by the relative lever ratio of said end extension levers may be ascertained.

6. In an apparatus for weighing an object and locating the plane of gravity thereof, the combination of a platform adapted to support the object, a pair of end extension levers respectively supporting the ends of the platform, said levers being of unequal ratio, a pair of change levers extending transversely of the platform and connected respectively with said end extension levers, a side extension lever to which both of said change levers are connected, an indicator mechanism connected with said side extension lever, means for changing the locations of the fulcra of said change levers, said indicating mechanism being arranged to indicate the actual weight of the object in one position of the fulcra of the change levers, and adjustable poises connected with said indicating mechanism whereby when the fulcra of said change levers are in another position the locus of the plane of gravity of the object on the platform with respect to a critical plane dependent upon the ratio of said end extension levers may be ascertained.

7. In an apparatus for weighing an object and locating the plane of gravity thereof, the combination of a platform upon which the object is supported, and extension levers of different ratios supporting the respective ends of the platform, a change lever operable by each of said end extension levers, means whereby the location of the fulcra of said change levers may be changed, a side extension lever connected to be operated by both of said change levers, indicating mechanism adapted to be actuated by said side extension lever, said indicating mechanism being adapted to indicate the true weight of the object when the change lever fulcra are adjusted to one position, and manually adjustable means connected with said indicating mechanism whereby when said change lever fulcra are adjusted to another position the locus of the plane of gravity of said object on the platform may be determined.

8. In an apparatus for locating the plane of gravity of an object, the combination of a platform, a plurality of lever systems of unequal ratio by which the ends of said platform are supported, change levers having changeable fulcra connected to said systems and means including a weight indicating mechanism and additional adjustable poises connected with said change levers for determining the locus on the platform of the plane of gravity of an object resting thereon.

9. In an apparatus for locating the plane of gravity of an object, the combination of a platform adapted to support the object, an end extension lever supporting one end of the platform, a second end extension lever supporting the opposite end of the platform, said levers being of unequal ratio, transversely extending change levers connected respectively with said end extension levers, a side extension lever connected with said change levers, means for changing the positions of the fulcra of said change levers, indicating mechanism operable by said side extension lever, and manually adjustable means attached to said indicator to compensate for the effect upon the indicator of the position changes of said lever fulcra.

10. The combination with a weighing scale comprising a platform, a lever system including end extension levers of unequal ratio supporting said platform at the ends thereof, change levers operable by said extension levers and an indicator connected to be operated by said system, of means including changeable fulcra for said change levers of said system and manually adjustable weight means attached to said indicator, whereby the locus of the plane of gravity of an object of known weight supported by said platform may be ascertained.

11. In an apparatus for locating the plane of gravity of an object, the combination of a platform, an indicator, means for supporting said platform, comprising a lever system arranged to influence the indicator under the dominance of an object of known weight on the platform in accordance with the location of said object on the platform, said system including an end extension lever, a change lever having changeable fulcra and a side extension lever connected to the indicator, and manually adjustable means attached to and adapted to influence said indicator whereby the locus of the plane of gravity of said object may be ascertained.

12. In an apparatus for determining the plane of gravity of an object, the combination of a platform adapted to support the object to be tested, a lever arranged to receive the weight imposed by one end of said platform, a second lever arranged to receive the weight imposed by the opposite end of said platform, said levers being of unequal ratio, indicator mechanism, means including change levers of unequal ratio for transmitting motion from said levers to said mechanism, and means adjustably carried by said indicator mechanism whereby the locus of the plane of gravity of the object on the platform with respect to a predetermined point on said platform may be determined.

13. In an apparatus for locating the plane of gravity of an object, the combination of a platform, a lever system for supporting said platform, including end extension levers respectively supporting the ends of the platform, said levers being of unequal ratio, a side extension lever, means including change levers having changeable fulcra connecting said side extension lever with the end extension levers, an indicator mechanism operable by said side extension lever, and manually adjustable means connected with and adapted to influence said indicator mechanism for cooperating with said lever system, whereby the locus of the plane of gravity of the object on the platform may be determined.

14. In an apparatus for locating the plane of gravity of an object, the combination of a platform, a lever system including levers of unequal ratio, a lever of one ratio being arranged to support the platform near one of its ends and a lever of a different ratio being arranged to support said platform near its other end, an indicator, means including change levers constituting a connection between said levers of unequal ratio and said indicator, and means including changeable fulcra for said change levers and balance modifying means on said indicator whereby the locus of the plane of gravity of an object resting on the platform may be determined.

OLIVER H. WATSON.